A. H. HEWES.
RECEPTACLE.
APPLICATION FILED DEC. 31, 1910.
991,303.
Patented May 2, 1911.
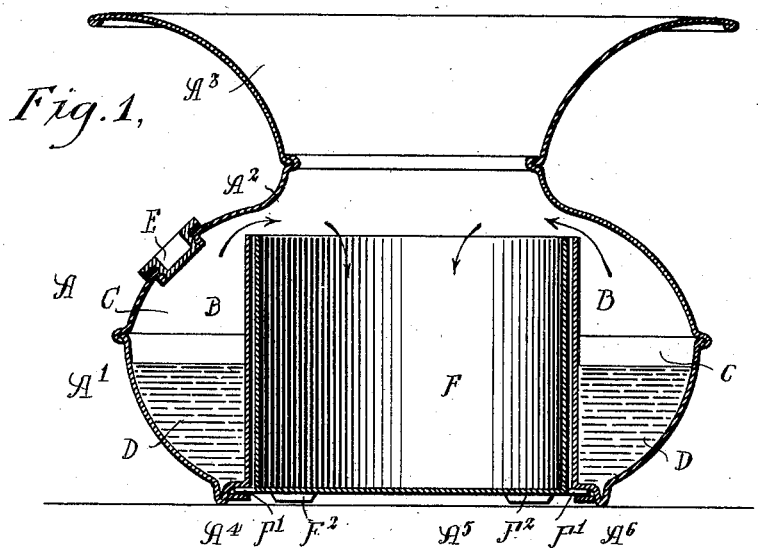
Fig. 1.
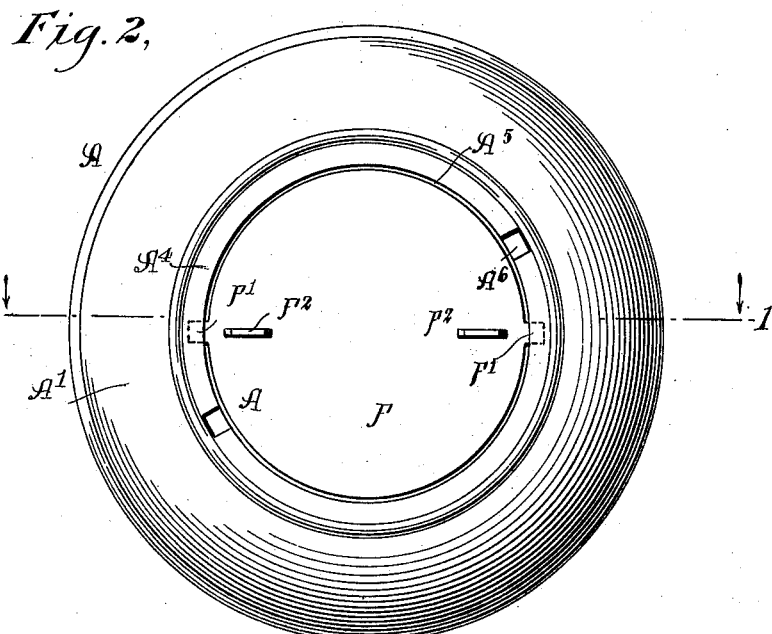
Fig. 2.
Fig. 3.
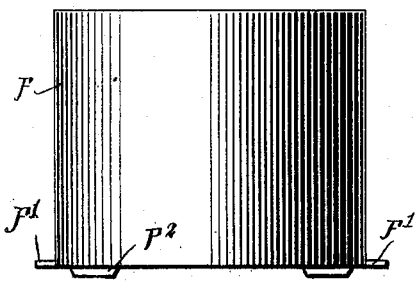
WITNESSES
Edward Thorpe
Geo. G. Hostry
INVENTOR
Albert H. Hewes
BY Munn & Co.
ATTORNEYS

UNITED STATES PATENT OFFICE.

ALBERT H. HEWES, OF NEWARK, NEW JERSEY.

RECEPTACLE.

991,303.

Specification of Letters Patent.

Patented May 2, 1911.

Application filed December 31, 1910. Serial No. 600,257.

*To all whom it may concern:*

Be it known that I, ALBERT H. HEWES, a citizen of the United States, and a resident of Newark, in the county of Essex and State of New Jersey, have invented a new and Improved Receptacle, of which the following is a full, clear, and exact description.

The invention relates to spittoons, water closets, refuse cans, and the like, and its object is to provide a new and improved receptacle which is sanitary and provided with a chamber containing formaldehyde or other disinfectant to destroy any germ or foul odors arising from the contents of the receptacle, and to permit of conveniently emptying the receptacle of its contents whenever it is necessary.

For the purpose mentioned, use is made of a shell provided with a chamber for containing formaldehyde or other disinfectant, and a receiving cup arranged in the shell and having its upper end adjacent to the inner wall of the said chamber so that the vapors arising from the disinfecting contents in the chamber pass over the mouth of the cup and thus come in contact with and destroy any germs or odors arising from the contents of the cup.

A practical embodiment of the invention is represented in the accompanying drawings forming a part of this specification, in which similar characters of reference indicate corresponding parts in all the views.

Figure 1 is a sectional side elevation of a receptacle in the form of a spittoon, the section being on the line 1—1 of Fig. 2; Fig. 2 is an inverted plan view of the same; and Fig. 3 is a side elevation of the cup.

The shell A of the receptacle may be of any desired shape, according to the use of the receptacle, for instance, as shown in Figs. 1 and 2, the shell A consists of a body $A'$ having a contracted neck $A^2$ and a flaring mouth $A^3$, similar to the shape of the metallic spittoons now generally in use. The bottom $A^4$ of the shell A is provided with a centrally arranged opening $A^5$, and from the wall of the opening rises integrally an annular partition B terminating a short distance from the contracted neck $A^2$, as plainly indicated in Fig. 1. The partition B forms with the body $A'$ of the shell a chamber C containing formaldehyde, or other disinfectant D, and the said chamber C is open at the top directly under the beginning of the contracted neck $A^2$. The body $A'$ is provided with a filling plug E for conveniently filling the chamber C with the disinfectant D. A receiving cup F is adapted to be passed through the opening $A^5$ into the shell, and the said cup fits with its side wall close to the partition B, and the upper end of the cup F is preferably flush with the partition B, that is, reaches within a short distance of the neck $A^2$ so that all vapors arising from the disinfectant D pass over the mouth of the cup F with a view to mingle with and destroy any germs or odors that may arise from the contents of the receiving cup F. By reference to Fig. 1, it will be noticed that the cup F and consequently the partition B are larger in diameter than the narrowest portion of the neck $A^2$ so that sputum or the like can readily pass through the flaring mouth $A^3$ and the contracted neck $A^2$ into the cup F to accumulate therein and without danger of sputum passing into the chamber C. The bottom of the receiving cup F is provided with outwardly-extending lugs $F'$ adapted to engage L-shaped grooves $A^6$ formed on the under side of the bottom $A^4$ to permit of removably securing the cup F in place on the bottom $A^4$ of the shell A. The bottom of the cup F is also provided with depending handles $F^2$ adapted to be taken hold of by the operator for turning the said cup F with a view to engage or disengage the lugs $F'$ from the grooves $A^6$. Other suitable fastening means may, however, be employed for removably securing the cup F in place.

It is understood that one charge of the disinfectant D may last a considerable length of time, as evaporation thereof is comparatively slow but sufficient to continually pass disinfecting vapors over the partition B and the upper end of the cup F across the mouth thereof, so that a thorough disinfecting of the contents of the cup takes place. The cup F may be removed from time to time for discharging its contents and cleaning the cup.

Having thus described my invention, I claim as new and desire to secure by Letters Patent:

1. A receptacle of the class described, comprising a shell, a partition within the shell and forming with said shell a chamber for containing a disinfectant, and a receiving cup in the said shell and surrounded by the partition, the said cup having its upper end adjacent the upper end of the inner wall of the said chamber so that the fumes rising from the disinfectant in the chamber pass over the mouth of the cup and come in contact with and destroy the germs or odors arising from the contents of the cup.

2. A receptacle of the class described, comprising a shell having a contracted neck and mouth, a partition within the shell and extending from the bottom of the shell to within a short distance of said neck and mouth, the said partition forming with the shell a chamber for containing a disinfectant, and a receiving cup removably held in the said shell and surrounded by the said partition so that the fumes arising from the disinfectant pass over the mouth of the cup.

3. A receptacle of the class described, comprising a shell having a contracted neck and a flaring mouth, the bottom of the shell having an opening, an annular partition within the shell and rising from the bottom thereof to within a short distance of the said neck, the said partition forming with the said shell a chamber for containing a disinfectant, and a receiving cup removably held within the shell and surrounded by the said partition, the upper end of the cup terminating a short distance from the said neck and the said cup being removable from the shell by way of the said bottom opening.

4. A receptacle of the class described, comprising a shell having a contracted neck and a flaring mouth, the bottom of the shell having an opening, an annular partition within the shell and rising from the bottom thereof to within a short distance of the said neck, the said partition forming with the said shell a chamber for containing a disinfectant, a receiving cup removably held within the shell and surrounded by the said partition, the upper end of the cup terminating a short distance from the said neck and the said cup being removable from the shell by way of the said bottom opening, and fastening means for removably fastening the cup in position on the shell.

5. A receptacle of the class described, comprising a shell, an annular partition within the shell and forming with said shell a chamber for containing a disinfectant, the shell being provided with an opening having a removable closure for the introduction of the disinfectant into said chamber, and a receiving cup within the shell and surrounded by said partition, the shell and cup being provided with co-acting fastening means for removably securing the cup to the shell.

In testimony whereof I have signed my name to this specification in the presence of two subscribing witnesses.

ALBERT H. HEWES.

Witnesses:
   THEO. G. HOSTER,
   PHILIP D. ROLLHAUS.

---

Copies of this patent may be obtained for five cents each, by addressing the "Commissioner of Patents, Washington, D. C."